Dec. 11, 1923.
DE WITT C. HARRIS
ANTIFRICTION SLIDING BEARING
Filed Sept. 1, 1921
1,477,260
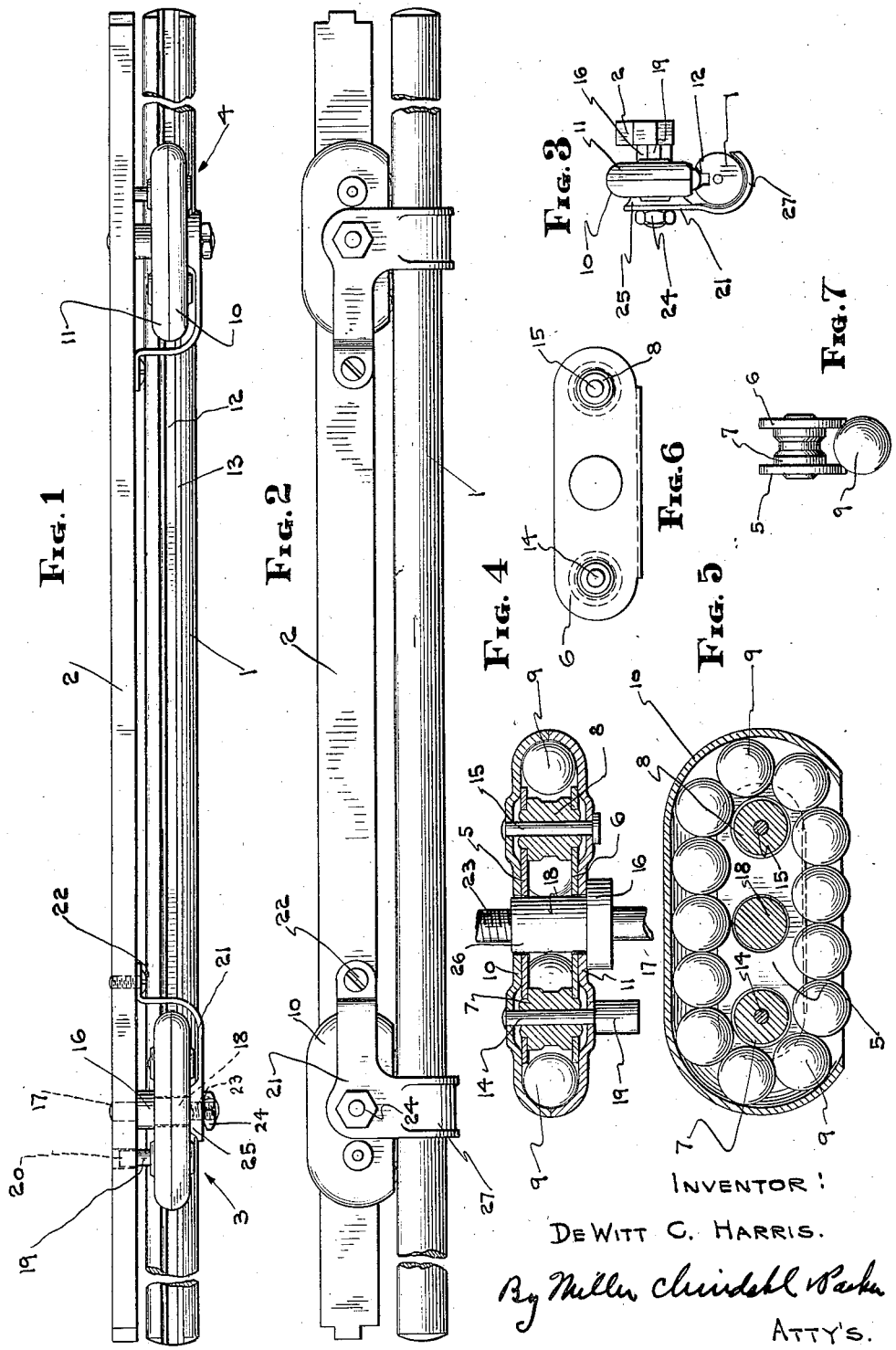
INVENTOR:
DeWitt C. Harris.
Atty's.

Patented Dec. 11, 1923.

1,477,260

UNITED STATES PATENT OFFICE.

DE WITT CLINTON HARRIS, OF PINELAND, FLORIDA.

ANTIFRICTION SLIDING BEARING.

Application filed September 1, 1921. Serial No. 497,650.

*To all whom it may concern:*

Be it known that I, DE WITT C. HARRIS, a citizen of the United States, residing at Pineland, in the county of Lee and State of Florida, have invented certain new and useful Improvements in Antifriction Sliding Bearings, of which the following is a specification.

The invention relates to anti-friction devices, especially as applied to relatively slidable parts.

One of the objects of the invention is to provide a rolling bearing between relatively slidable members in which the rolling elements may travel in an endless raceway thereby avoiding the binding and increased friction consequent upon the stoppage of the free movement of the rolling elements at the ends of a straight raceway.

Another object is to provide a raceway for the rolling elements which is capable of a pivotal movement permitting the perfect alinement at all times of the load-carrying portion of the raceway with its supporting track.

Another object is to provide such a bearing device which is of very simple construction and comprises parts which are inexpensive to manufacture.

Other objects and advantages will be apparent in the following detailed description of a preferred embodiment of my invention which I have illustrated in the accompanying drawings as incorporated with the carriage slideways in a typewriter.

Fig. 1 of the drawings is a plan view of my device as associated with the slide members of a typewriter carriage and frame. Fig. 2 is a side view and Fig. 3 an end view of the same. Fig. 4 is horizontal sectional view of the device and Fig. 5 a vertical section of the same. Fig. 6 is a detail view of one of the bearing plates. Fig. 7 is an end elevation of the two bearing plates and spacer blocks.

Referring to Figs. 1, 2 and 3, the numeral 1 indicates a horizontal bar rigidly fixed upon the typewriter frame and which forms the slideway for the lateral movement of the typewriter carriage. One of the members of the carriage is indicated at 2. My device as illustrated herein may be mounted on the carriage member 2 as indicated at 3 and 4, and arranged to bear upon a suitable way formed in the upper surface of the bar 1.

As illustrated in Figs. 4 and 5, the device comprises a pair of spaced plates 5 and 6 formed of hardened metal and rigidly secured to each other by means of spacer blocks 7 and 8 preferably swaged at each end into oppositely positioned apertures formed in the plates 5 and 6. The plates 5 and 6 are of like form, their peripheries in the present instance being shaped with rectilinear upper and lower sides the lower sides being inwardly beveled, and with curved ends. The peripheral edges of the spaced plates form a continuous raceway for a plurality of anti-friction balls 9, of a sufficient number to lie in substantially continuous relation entirely about the bearing edges of the plates.

The balls are held in position upon the raceway by a sectional case comprising two cup-shaped members 10 and 11 which, when assembled with the plates 5 and 6 with the edges in abutment, serve to retain the balls in position upon the raceway. The lower portion of each case member is cut away to partially expose those of the balls which are positioned upon the lower rectilinear portion of the raceway so that they may bear upon the supporting bar 1.

To form a suitable way or track for the travel of the balls upon the bar 1, a channel 12 may be cut longitudinally in the upper surface of the bar, and formed with inclined sides 13 with which the balls which are exposed at the lower portion of the case may engage in rolling contact. The members 10 and 11 comprising the ball retaining case may be secured in position by means of rivets 14 and 15 extending centrally through the spacer blocks 7 and 8, and having end portions headed over the members of the retaining case.

In securing the device to the movable carriage member 2, I have provided a flanged pivot stud 16 fixed in the member 2, as by the extended portion illustrated at 17, and having a cylindrical portion 18 projecting through centrally located bearing apertures formed in the spaced raceway plates and in the two members forming the ball retaining case. It will be obvious that the assembled bearing device may rotate or rock about the pivot stud, thus enabling the device to adjust itself to any slight irregularities or curvatures in the supporting tracks, whereby each of the balls in bearing contact with the track may bear its proportionate part of the load by virtue of their self-alinement.

For the purpose of limiting this rotative movement within a practical arc of movement I have provided a projecting head 19 upon the rivet 14 which extends into an opening 20 in the carriage member 2, the opening being of somewhat larger diameter than the diameter of the projecting head. I have found that the desirable results to be obtained by the pivotal movement of the bearing in the construction illustrated herein necessitate only a slight arc of movement in the latter, and a comparatively slight amount of play between the projecting head and the walls of the opening is sufficient to permit alinement at all times between the bearing balls and the track upon which they run.

The bearing device is further supported by means of an angular bracket 21 having one end secured to the carriage member as at 22, and its angle portion secured at the outer end of the pivot stud 16 by means of the screw-threaded extension 23 and nut 24. The angle portion of the bracket is formed with an inwardly dished section 25 abutting the shoulder 26 near the outer end of the pivot stud, thereby forming with the flanged portion of the stud a pair of lateral abutments for the case members, to retain the bearing device in position. The shoulder 26 preferably is positioned slightly outward from the outer case member, and the journal portion 18 of the pivot stud preferably is of slightly less diameter than its bearing apertures in the case members and race plates, thus providing for a slight lateral movement of the bearing device to facilitate its self alinement with the track way. Another arm 27 of the bracket 21 extends downwardly and is curved beneath the track rod 1 to prevent the upward displacement of the bearing device. It will be noted that the spaced plates and the sectional retaining case may be formed from sheet metal stock by simple and inexpensive stamping means.

It will now be apparent that I have provided an antifriction bearing between relatively slidable members which is self-alining as to the bearing elements, which by reason of the continuously free movement of the bearing elements reduces friction to a minimum, and is of simple enduring construction.

I claim as my invention:

1. A device of the class described having, in combination with a sliding element, a plurality of rolling bearing elements, an endless raceway therefor, and means for retaining said elements in said raceway arranged to expose certain of said elements successively for bearing contact with a track, said device being pivotally mounted on said sliding element to permit self-alinement of said contacting elements with the track.

2. In combination, a sliding element, a track and a roller bearing device interposed between said element and track, said device having a rectilinear bearing portion with guided contact on the track, connecting means for said element and device comprising two pivotal pins and bearings, the pins being loose in the bearings whereby a limited vertical and lateral motion of the bearing device is obtained, one of said pins passing through the device and having a retaining means thereon to secure the device to the element.

3. A device of the class described comprising, in combination, a pair of like spaced plates the peripheries of which form a continuous raceway, a plurality of anti-friction balls positioned in said raceway, a sectional case adapted to retain said balls in said raceway and permit bearing contact between certain of said balls and a track, and a pivotal support for said plates having its axis perpendicular to the plane of movement of said balls.

4. In combination with a stationary member and a movable member slidably supported thereon, an anti-friction bearing device comprising a part forming an endless raceway, a plurality of rolling bearing elements, means for retaining said elements in said raceway adapted to permit bearing contact between certain of said elements and one of said members, a pivotal support for said part carried by the other of said members and arranged transversely to said raceway, a lug fixed on said part and projecting into an opening in said last mentioned member, said opening being adapted to permit limited movement of said lug with the rotation of said part upon its pivotal support.

5. In a device of the class described, a pair of spaced plates of like peripheral dimensions, spacer blocks securing said plates in rigid inter-relation, rolling bearing elements positioned for continuous travel about the peripheries of said plates, a pair of oppositely positioned casing members adapted to retain said bearing elements in position about said plates and means for securing said casing members to said plates.

6. A device of the class described having, in combination, a plurality of rolling bearing elements, a member forming an endless raceway therefor, means for retaining said elements in said raceway arranged to expose certain of said elements successively for bearing contact with a track, said member being pivotally mounted to permit self-alinement of said contacting elements with the track, and means adapted to limit the pivotal movement of said member.

7. In a device of the class described, a pair of spaced plates adapted to form a continuous raceway, a plurality of anti-friction bearing elements positioned in said raceway, and a pair of casing members retaining said elements in said raceway and arranged to enclose the same except a portion of said elements successively exposed for bearing contact with a track, said plates and said casing members being struck from sheet material.

8. In combination with a sliding element and a track, a bearing device comprising a plurality of aligned rollers in contact with the track, a supporting body for said rollers, a rocking connecting means between said element and said device comprising two pivotal pins with oversized bearings therefor, and means for maintaining said pins loosely in said bearings.

9. In a device of the class described, a casing comprising parallel plates interfitting to form an endless raceway, a plurality of rolling elements filling said raceway, means on said casing to maintain the rolling elements in said raceway, a portion of said casing being cut away to expose the rolling elements to a supporting track, and a single supporting means passing transversely through the casing to connect the device to an element to be supported on said supporting track.

10. A typewriter having, in combination, a track, a carriage slidably supported on the track, a plurality of anti-friction roller devices for supporting the carriage, each device having roller bearing elements contacting the track, said elements moving in a continuous raceway within the device, a bracket on the carriage having a pivotal pin with extremities supported in said bracket and carriage, said pin passing through an opening in the roller device whereby the latter is pivotally attached to the carriage, and a lug extending parallel to said pin into an opening in said carriage, said second opening being larger than the lug to limit the motion of the roller device about its pivotal pin.

In testimony whereof, I have hereunto set my hand.

DE WITT CLINTON HARRIS.